United States Patent [19]

Büscher

[11] 3,912,628
[45] Oct. 14, 1975

[54] METHOD OF AND APPARATUS FOR PROCESSING SLAG, ESPECIALLY FURNACE SLAG

[75] Inventor: Heinz Büscher, Dortmund-Hochsten, Germany

[73] Assignee: Hoesch Werke Aktiengesellschaft, Dortmund, Germany

[22] Filed: Dec. 11, 1973

[21] Appl. No.: 423,807

[30] Foreign Application Priority Data
Dec. 13, 1972  Germany............................ 2260924

[52] U.S. Cl. .................. 210/75; 210/193; 210/196; 210/266
[51] Int. Cl.² ......................................... B01D 37/02
[58] Field of Search .............. 65/19, 20; 210/66, 75, 210/76, 193, 196, 197, 232, 266, 433; 75/24

[56] References Cited
UNITED STATES PATENTS
| | | | |
|---|---|---|---|
| 660,498 | 10/1900 | Fleming .......................... | 210/433 X |
| 1,302,814 | 5/1919 | Kuryla ............................. | 210/75 X |
| 2,236,895 | 4/1941 | Court............................... | 210/196 X |
| 3,351,203 | 11/1967 | Robb ............................... | 210/196 X |
| 3,508,660 | 4/1970 | Takano............................ | 210/295 X |

Primary Examiner—Frank A. Spear, Jr.
Assistant Examiner—Robert G. Mukai
Attorney, Agent, or Firm—Walter Becker

[57] ABSTRACT

A method of and apparatus for processing slag, especially furnace slag, according to which the slag to be processed is granulated by water to obtain a mixture of slag sand and water which is then introduced into the top position of silo means at the bottom portion of which at least a portion of the water collecting at the bottom portion of the silo means is withdrawn. This withdrawn water is returned into the top portion of the silo means until a filter layer of slag sand has formed in the lower portion of the silo means. The water in the silo means is then filtered by the thus formed filter layer, and at the end of the filtering operation the nearly dry slag sand is withdrawn from the lower portion of the silo means.

3 Claims, 1 Drawing Figure

U.S. Patent  Oct. 14, 1975  3,912,628
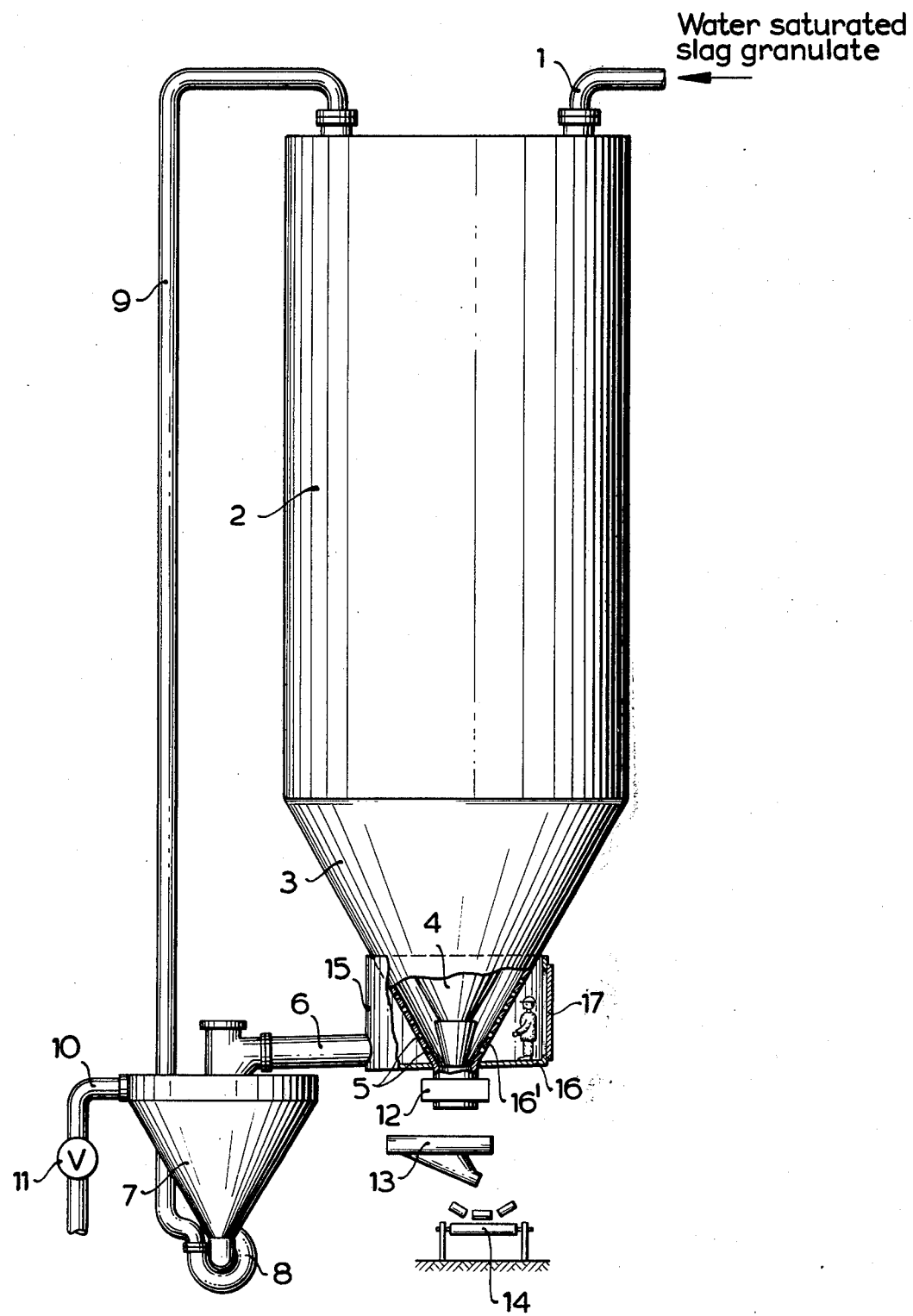

METHOD OF AND APPARATUS FOR PROCESSING SLAG, ESPECIALLY FURNACE SLAG

The present invention relates to a method of and device for processing slags, especially blast furnace slags, which are granulated by means of water and are dried by a filter. As filter layer, granulated slag is used, and the dried slag sand is withdrawn in downward direction from the filtering vessel. The device according to the invention for practicing the method of the invention comprises a drainage silo which serves as filtering vessel and is provided with a discharge opening that is adapted to be closed and the lower end of which is of a conical shape and forms a screen cone with a screen bottom, said device also comprising a shaking chute or screen arranged below the discharge opening, and also including a conveyor belt.

Methods and devices for processing slags which are granulated by means of water are known and are described for instance in the book "Hochofenschlacke" by F. Keil, 2nd. edition 1963, page 58 et seq. According to one of these methods, the slag for instance blast furnace slag, granulated by means of water is introduced into a vessel or tank in which there is arranged a filter layer of classified gravel, and more specifically, the lower most gravel layer comprises a granular size of from 15 to 30mm, whereas the next higher layer comprises a granular size of from 7 to 15mm, and the uppermost gravel layer comprises a granular size of from 3 to 7mm. The water content in the slag sand passes through the gravel layers serving as filter and in this way is purified and the slag sand is drained. The residual content in moisture of the slag sand will after this treatment amount to approximately 20%. A drawback of this heretofore known method consists in that the slag sand has to be removed from the filter layers by means of grippers or grabs, grab buckets, etc., and furthermore, the gravel layers have to be rinsed and have to be frequently renewed. The heretofore known implements or devices for practicing said known method require a considerable space.

In order to overcome these drawbacks, a method for processing slags, especially blast furnace slags, has been suggested according to which the slags are granulated by means of water and are dried by a filter. According to this method granulated slag is employed as filter layer and part of the drained sand is retained as filter. The main portion of the sand is withdrawn in downward direction from the filtering vessel, and the sand which has been drained to a great extent is centrifuged dry. While this method has proved useful, it is insufficient in view of the output required with modern large installations.

It is, therefore, an object of the present invention to provide a device and method of the general character set forth above, by means of which the quantities of granulated slag or slag granulate obtained in large installations can be processed without difficulties in a minimum of time.

It is another object of this invention to provide a method and device as set forth in the preceding paragraph, which will greatly improve the mechanical degree of purity of the filtered water without increasing the moisture content of the slag sand or granulate so that the slag sand or granulate will be transportable without taking further steps.

These and other objects and advantages of the invention will appear more clearly from the following specification in connection with the accompanying drawing diagrammatically illustrating a device according to the present invention for practicing the method of the present invention.

The method according to the present invention for processing slags, especially blast furnace slags which are granulated by water and are dried by a filter while granulated slag or slag granulate is employed as filter layer, and the dried slag sand or granulate is withdrawn downwardly from the filtering vessel, is characterized primarily in that the total quantity of the dried slag sand or granulate is withdrawn in downward direction from the filtering vessel whereupon the filtering vessel which is closed at the bottom is rinsed by means of the water-sand mixture originating from the following slag tap, and the water and fine granulate mixture is pumped back in upward direction into the filtering vessel until a granulate or sand filter layer has formed in the filtering vessel.

The device according to the invention for practicing the method according to the invention is so designed that at the screen bottom with screen slots there is provided a cone shaped granulate collecting hopper for the pump with a circulating pump arranged therebelow and adapted to be turned on and off. Connected to said circulating pump is a conduit which from above leads into the filtering vessel, while advantageously an overflow pipe with a valve is connected to the upper portion of said sand collecting hopper for the pump.

According to a further feature of the invention, the screen bottom of the screen cone is surrounded by a sheet metal housing on which an operator can walk and which by means of a connecting pipe is connected to said sand collecting hopper for the pump and is provided with a bottom which is inclined toward the connecting pipe.

Referring now to the drawing in detail, the water saturated slag granulate is through a pipe 1 passed into an empty draining fluid containing silo 2 which serves as filtering vessel and the lower end of which forms a conical screen cone 3 with a screen bottom 4. The screen bottom 4 is provided with screen slots 5 through which the water which at the start of the process is mixed only with relatively fine particles passes through a connecting pipe 6 into a conical sand collecting hopper 7 for a circulating pump 8, whereby the screen bottom 4 is rinsed free from any granulate which might have remained from the preceding granulating process. At the start of the granulating operation, circulating pump 8 is turned on which is arranged below said granulate collecting hopper 7 and by means of which a portion of the water which is mixed with fine particles is pumped through the pipeline 9 and from above back into the draining silo 2.

As soon as a sufficiently thick filtering layer of slag granulate or sand has formed in the screen cone 3, which is indicated by the clean filtered water leaving the screen cone 3, the circulating pump 8 is turned off, and a valve 11 located in the overflow pipe 10 of the fine granulate collecting hopper 7 is opened. The mechanically cleaned water is then returned into the circulating circuit of the water, and, if desired, may be cooled.

After the entire granulation water has been discharged through the slag granulate serving as filter, a valve 12 arranged below the screen cone 3 by means of which valve the drainage silo 2 is closed during the filtering in downward direction, is opened and the slag granulate is discharged downwardly through a shaking chute or screen 13 and conveyed to a conveyor belt 14.

As soon as the entire slag granulate or sand has been discharged from the drainage silo 2, the valves 11 and 12 are closed and the apparatus is ready for receiving another water granulate mixture from the next slag tap.

The screen bottom 4 of the screen cone 3 is surrounded by a sheet metal housing 15 to which is connected the connecting pipe 6 leading to the fine granulate collecting hopper 7. In order to be able in spite of the bottom 16 of the housing 15 being inclined to the connecting pipe 6, to remove the sand or granulate collecting on the bottom 16, in a simple manner and thereby to maintain the output capability of the apparatus, the sheet metal housing 15 as well as the screen cone 3 are so designed that the sheet metal housing 15 as well as the screen cone 3 can be walked upon and are easily accessible. To this end a door 17 may be provided and screwed to the sheet metal housing 15, and at least a portion 16' of the screen bottom 4 may be removable.

As will be evident from the above, the advantage of the method and apparatus according to the invention consists primarily in that in a simple manner and with relatively little equipment, the very large slag quantities forming in modern installations can without difficulty and directly be processed to transportable slag granulate or sand while maintaining very short draining and filtering periods. Simultaneously, the mechanical degree of purity of the filtered water permits immediate reemployment thereof. It is, of course, to be understood that the present invention is, by no means, limited to the specific showing in the drawing but also comprises any modifications within the scope of the appended claims.

I claim:

1. A method of processing slag from a furnace, which includes the steps of: granulating by water the slag to be processed so as to obtain a mixture of slag granulate composed of fine and coarse particles, and water, introducing the slag granulate and water mixture into a fluid container silo means at the top portion of the silo means, screening the mixture by a perforate wall forming a screen at the bottom of said silo means to form a bed of slag on said screen while passing the water and a portion of said fine particles through said screen, collecting said water with fine particles passing through said screen, and pumping said water with fine particles collected back to the top portion of said silo means to filter the fine particles from water by said bed of slag granulate, drawing off said water when clear of fine particles, and withdrawing said slag granulate bed from said silo means.

2. An apparatus for processing slag, especially blast furnace slag, which includes: a fluid container silo means for receiving a mixture of water and granulated slag composed of fine and coarse particles, said silo means being provided with a lower conical end portion having screen bottom means with slots and surrounding housing means, said conical end portion also being provided with a discharge opening having means for selectively opening and closing the opening, reciprocable sifting means arranged below said discharge opening and adapted to receive slag through said discharge opening when the latter is in open condition, conveying means arranged below said discharge opening for receiving and conveying particles of slag from said sifting means, collecting hopper means and means to convey water with fine particles from said housing means to said hopper means, recirculating pump means connected to the bottom of said hopper means, conduit means leading from the pressure side of said pump means into the upper portion of said silo means for recirculating water and fine particles passed through said slots to the suction of said pump and a conduit including a valve for opening said conduit connected to said hopper means for drawing off water from said hopper means.

3. An apparatus according to claim 1 in which said housing means is constructed and arranged to be entered by an operator, said housing means further having a bottom inclined toward the area where said housing means is connected to said means to convey water with fine particles.

* * * * *